Sept. 10, 1957 N. C. WILLIAMS 2,805,656
EXHAUST BRAKE SYSTEM
Filed April 30, 1956 2 Sheets-Sheet 1

INVENTOR
Norman C. Williams
BY
AGENT

Sept. 10, 1957 N. C. WILLIAMS 2,805,656
EXHAUST BRAKE SYSTEM
Filed April 30, 1956 2 Sheets-Sheet 2

INVENTOR.
Norman C. Williams
BY
AGENT

United States Patent Office 2,805,656
Patented Sept. 10, 1957

2,805,656

EXHAUST BRAKE SYSTEM

Norman C. Williams, Portland, Oreg., assignor to Power Brake Equipment Company, a corporation of Oregon Application April 30, 1956, Serial No. 581,620

7 Claims. (Cl. 123—97)

This invention relates generally to braking systems for automotive vehicles and more particularly to a manually controlled auxiliary exhaust braking system.

As a specific form in which may invention may be practiced the invention is here disclosed as a manually controlled partially manually and partially vacuum operated exhaust braking system for a vehicle powered by a four cycle internal combustion engine having an inlet manifold providing a power source of air at less than atmospheric pressure.

Attention is called to my application S. N. 457,074, filed September 20, 1954, now abandoned, of which this application is a continuation in part.

It is a primary object of the present invention to provide a simplified general purpose exhaust brake system applicable at relatively small cost to smaller commercial vehicles to which a pressure operated system or a more elegant modulating system could not economically be applied.

The novel and useful system of this invention is a desirable auxiliary system for a vehicle provided with pedal controlled wheel brakes equipped with booster elements powered by the partial vacuum produced at the inlet manifold of the engine when the engine is running. But it should be noted that the exhaust brake system consists basically of means for blocking the exhaust line of the engine substantially to cause the engine to cease functioning as such and no longer to be a source of vacuum power.

It is a second object of this invention to provide means for maintaining the effectiveness of the vacuum boosters of the wheel brakes and to limit the availability of the exhaust brake system to use only when the vacuum power available for wheel brake operation is above a pre-set limit.

How these and other objects are attained is explained in the following description referring to the attached drawings in which Fig. 1 is a schematic drawing showing the essential elements and connections for the manually controlled, manual and vacuum operated exhaust braking system of my invention.

Like numerals of reference refer to like parts in the several figures of the drawings.

Figure 4:
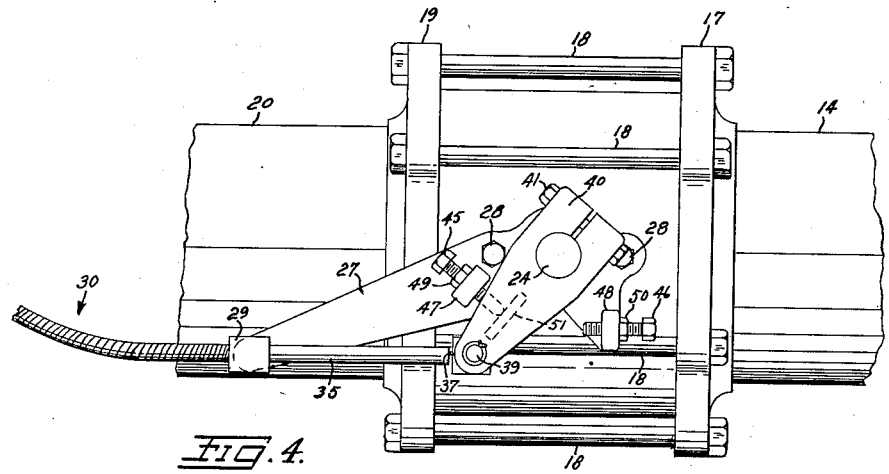
Fig. 4 is a view in side elevation along the line 4—4 of Fig. 2.

Referring now to the drawings at 11 is shown fragmentally an internal combustion engine block having an inlet manifold 12 and an exhaust manifold 13 to which is connected by flange bolts 15 an exhaust pipe 14 having flanged ends 16 and 17. Connected by bolts 18 between flange 17 and flanged end 19 of tail pipe 20 is cylindrical housing 21 of exhaust damper 22 secured by bolts 23 to damper shaft 24 journalled as shown in bearing bosses 25, 26 of housing 21. Bracket 27, see Fig. 4, secured by screws 28 to bearing boss 26 of housing 21, has secured to its free end coupling 29 of damper operating cable 30 the other end coupling 31 of which is securely held by bracket 32a held by bolts 32 to vehicle steering column 33. Between couplings 29 and 31, cable 30, sometimes called an "Ahrens" cable, comprises an inner flexible cable, not shown, freely guided for endwise movement in an outer flexible sheath cable 34 finished at its ends with rigid guiding tubes 35, 36 for solid wire extensions 37, 38 of the inner flexible cable. Cable end 37 is engaged at 39 with a damper lever 40 secured to shaft 24 by bolt 41. Cable end 38 is engaged at 42 with manual operating lever 43 pivoted on bracket 32 at 44. The limits of throw of operating lever 43 and damper lever 40 are determined by limit screws 45, 46 threaded into ears 47, 48 of bracket 27 and secured by lock nuts 49, 50. The positions of the threaded ends of screws 45, 46 limits the travel in either direction of ear 51 of lever 40.

Figure 1:
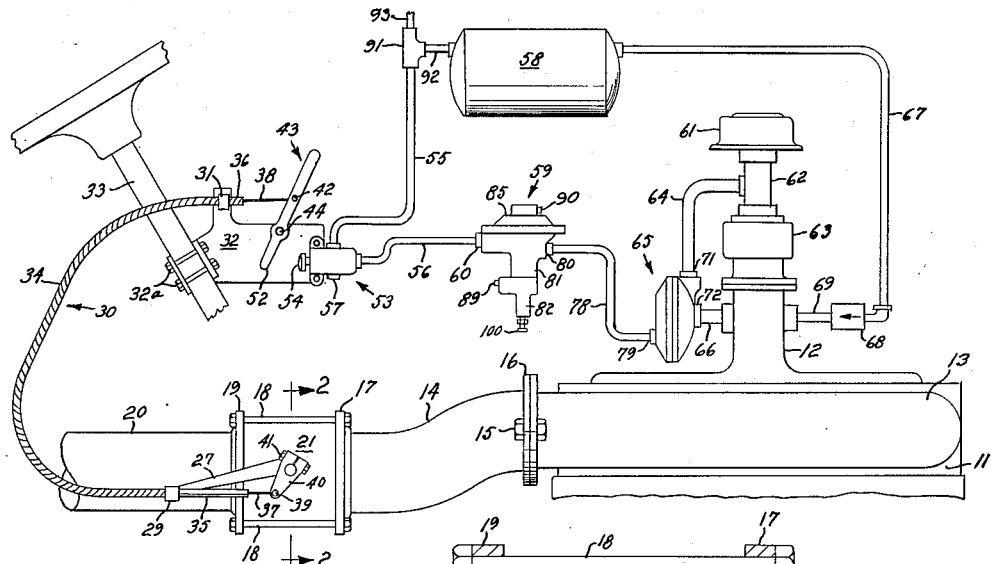
Figure 2:
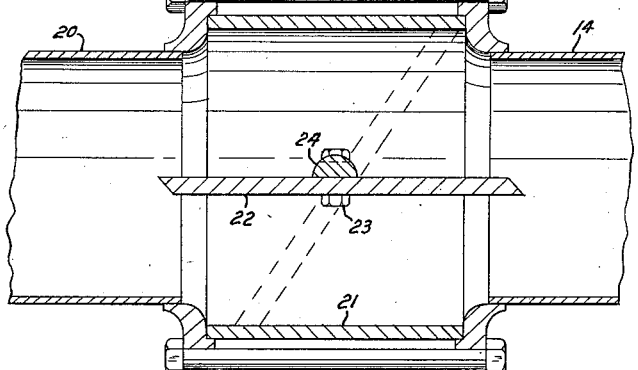
Fig. 2 is a view in vertical section along the line 2—2 of Fig. 1.
Figure 3:
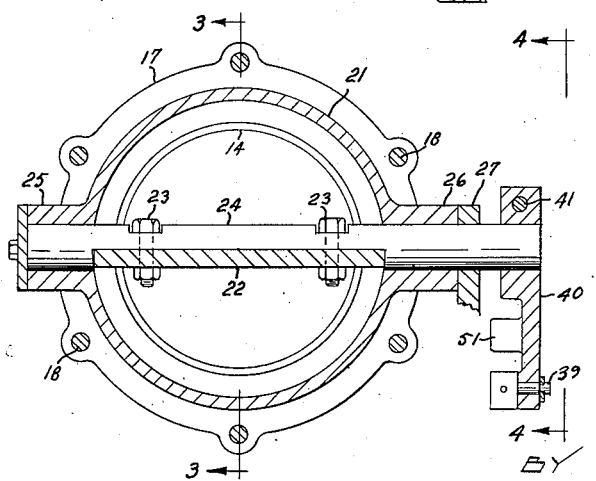
Fig. 3 is a view in vertical section along the line 3—3 of Fig. 2.

In its position shown in Fig. 1 manual exhaust brake damper operating lever 43 pivoted at 44 on bracket 32 has been moved forward, taking with it cable 38, 37, and the free end of damper lever 40 to position damper 22 to the open position of exhaust duct 14, 20.

When the truck driver pulls the upper end of lever 43 rearwardly cable 38, 37 pushes on lever 40 to position damper 22 to its position of closure of exhaust duct 14, 20. At the same time that the upper end of lever 43 is finishing the closure of damper 22 its lower end 52 strikes the operating stem 54 of three way valve 53 to operate valve 53 from its biased position of blocking vacuum air line 55 and connecting line 56 to atmospheric port 57 to its brake operative position of blocking port 56 and connecting lines 55 and 56 to apply vacuum air power from storage tank 58 to vacuum governor 59 at its port 60.

In normal operation, four cycle internal combustion engine 11 creates a partial vacuum in inlet manifold 12 by drawing combustion air from the atmosphere through air cleaner 61, pipe 62, and carbureter 63. Thus in normal operation air is induced from tank 58 through line 67, one way check valve 68 and line 69 to manifold 12 to maintain a potential source of vacuum air power in tank 58. But, as is well known, the supply of fuel to the inlet manifold through the carbureter is controlled by the rate of air flow through the carbureter so that by by-passing the carbureter and admitting clean atmospheric air from pipe 62 to manifold 12 through pipes 64, 66 and relay 65 the carbureter becomes inoperative to supply fuel to the engine.

Figure 5:
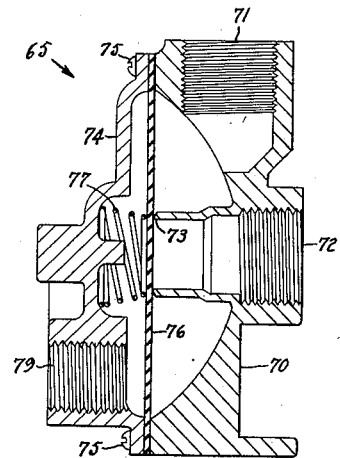
Fig. 5 is a sectional view in side elevation of the atmospheric valve of Fig. 1.

Relay 65 is seen in Fig. 5 to have a body 70 with air line connections 71, 72 and a valve seat 73. Secured to body 70 by cover 74 and screws 75 is diaphragm valve 76 normally biased to its closed position on valve seat 73 by spring 77. Vacuum line 78 connects vacuum line connection 79 of cover 74 to connection 80 of vacuum governor 59.

Figure 6:
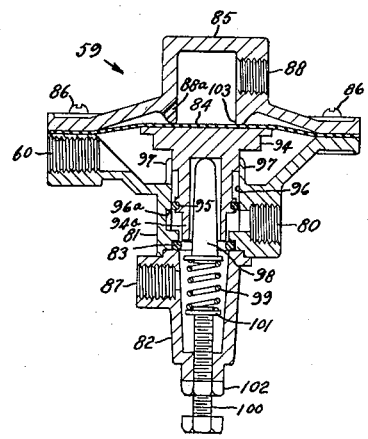
Fig. 6 is a sectional view in side elevation of the vacuum governor valve of Fig. 1.

In Fig. 6 vacuum governor 59 is seen to have a hollow body 81 open at both its upper and lower ends and closed at its lower end by turret 82 secured to body 81 by screws, not shown, and sealed to body 81 by O-ring 83 which also forms a seat for the atmospheric relief valve formed by the reduced diameter lower end 94a of stem 94. Body 81 is closed at its upper end by diaphragm 84 secured thereto by cover 85 and screws 86. Turret 82 and cover 85 are formed respectively with atmospheric openings 87 and 88 into which small air filters 89, 90 are secured. Circular lip 103 formed in cover 85 limits the upward travel of diaphragm 84 the entire upper surface of which is exposed to the atmosphere through connection 88 and hole 88a.

Valve stem 94 carrying O-ring valve 95 is slidably guided in cylindrical guiding surface 96 and the upward extension thereof formed by spaced fingers 97. Guiding surface 96 at its lower end terminates at annular ledge 96a which forms the seat for main valve 95. It should be particularly noted that as valve stem travels downward, relief valve 94a first closes on O-ring valve seat 83 to seal connection 80 from atmosphere connection 87 and immediately thereafter main valve O-ring 95 slides away from its seat 96a to open connection 80 to connection 60. Stem 94 is biased upwardly against diaphragm 84 by rigid finger 98 riding on biasing spring 99 supported on adjusting screw 100 by seat washer 101. Screw 100 is threadedly carried in the lower end of turret 82 and secured by lock nut 102.

Pipe T 91 connects through line 92 with tank 58, through line 55 with the three way valve 53 and through line 93 with the vacuum booster devices of the wheel brakes which are no part of this invention but are the primary users of the vacuum power potential stored in tank 58.

In the disclosed form my exhaust braking system operates as follows.

Assuming that the vehicle is operating normally on the highway with the engine pulling the vehicle and the parts of my system positioned as shown in the drawings and the vehicle comes to a downgrade, the driver takes his foot off the throttle to reduce the engine pull but the grade increases and the vehicle starts to run faster than the driver considers right under the circumstances. To save his wheel brakes in a cool condition for emergency use he pulls back on lever 43 and by cable 30 pushes damper 22 in to its position of approximate closure of damper 22 in exhaust line 14, 20. At the same time end 52 of lever 43 pushes stem 54 of three way valve 52 to its position of connection of lines 55 and 56, thus inducing in the interior of body 81 of governor 59 below diaphragm 84 and above O-ring 95 the same partial vacuum which exists in tank 58. (Note that on governor 59 the space about the reduced diameter of stem 94 above O-ring 95 communicates with connection 60 between fingers 97.) The partial vacuum under diaphragm 84 causes stem 94 to be moved downwardly against the bias of spring 99 until first atmospheric relief valve 94a, 83 is closed and then main valve 95, 96a, is opened and the space around stem 94 above O-ring 95 communicates with connection 80 as well as with connection 60 through the slots between fingers 97. In other words, when the pressure under diaphragm 84 is sufficiently reduced for atmospheric pressure above diaphragm 84 within cover 85 to overcome the bias of spring 99 then diaphragm 84 moves downwardly taking with it stem 94 first to close valve 94a, 83 and then to open valve 95, 96a to connect connection 60 with connection 80 which, in turn, through pipe 78 and connection 79 is connected with the space on the spring side of diaphragm 76 in relay 65. Now with the space on the spring side of diaphragm 76 thus connected through to tank 58 the bias of spring 77 is overcome and diaphragm valve 76 opens away from its seat 73 and air is by-passed around carbureter 63 by pipe 64 relay 65 and pipe 66 to inlet manifold 12 so that manifold 12 is substantially at atmospheric pressure and draws neither fuel or combustion air through carbureter 63.

With carbureter 63 by-passed by pipe 64, relay 65 and pipe 66 and with damper 22 approximately closing the exhaust line from the engine, the engine operates as a compressor against the back pressure of damper 22 and can exert braking power on the vehicle up to a fifth of the pulling power of the engine when it is in normal operation. Thus the exhaust brake is sufficiently effective to do a high percentage of the running braking of the vehicle and the wheels brakes are kept cool in reserve for complete stopping or emergency operation.

Since the wheel brakes depend on vacuum operators for satisfactory use and since there is no vacuum in motor inlet 12 when the exhaust braking mechanism is working, it is imperative that the pressure in tank 58 not be allowed to rise above that degree of vacuum which will operate the wheel brake boosters satisfactorily. To take care of this requirement screw 10 of governor 59 is so set that the connection between lines 56, 78 through governor 59 will not be opened unless a pre-selected degree of vacuum is in line 56 and will be closed under the bias of spring 99 whenever the vacuum in line 56 drops below the pre-set valve.

It is thus seen that I have provided a manually operated, all on, all off, exhaust braking system which includes a vacuum testing and restoring means adapted to assure at all times the availability of sufficient potential vacuum power in tank 58 to operate the wheel brakes. It is understood that when the valve through governor 59 closes, relay 65 closes and fuel and air are supplied to the inlet manifold of engine 11 to cause it to run as an engine and restore the vacuum to tank 58.

Having thus recited some of the objects of my invention, illustrated and described a preferred form in which my invention may be practiced and explained its operation, I claim:

1. An exhaust braking system for a vehicle powered by an internal combustion engine having an inlet manifold in which a partial vacuum is produced by the resistance to air flow of a carbureter interposed between said inlet manifold and the atmosphere, said system including a vacuum tank, a first duct connecting said inlet manifold to said tank to produce a partial vacuum in said tank when said engine is running as an engine, a check valve in said first duct to allow air flow in said first duct only towards said inlet manifold, a normally closed by-pass valve connecting said inlet manifold to the atmosphere, a vacuum powered operator for said by-pass valve adapted when energized to open said by-pass valve, an air conduit connecting said vacuum powered operator to said tank and a vacuum limit control interposed in said conduit between said tank and said vacuum powered operator, said limit control comprising an air valve, means biasing said air valve towards a closed position together with means responsive to the degree of vacuum in said conduit between said limit control and said tank to open said air valve when said degree of vacuum attains a pre-set value.

2. The exhaust braking system of claim 1 in which said vacuum limit control includes an atmospheric relief valve operable to open said conduit to the atmosphere between said air valve of said limit control and said by-pass valve and said means responsive to the degree of vacuum in said conduit includes means operable to close said atmospheric relief valve before said air valve is opened and to close said air valve before said atmospheric relief valve is opened.

3. The exhaust braking system of claim 2 including a three-way valve adapted overlappingly and alternately to connect said limit control through said second conduit to said tank and the atmosphere together with a first manual means for operating said three-way valve.

4. The exhaust braking system of claim 3 in which said engine includes an exhaust manifold, an exhaust conduit connecting said exhaust manifold to the atmosphere, a damper in said exhaust conduit and a second manual means operable alternately to move said damper to its open and closed positions of said exhaust conduit.

5. The exhaust braking system of claim 4 in which said first and second manual means are operated in unison by the same manually operate handle.

6. An exhaust braking system for a vehicle powered by an internal combustion engine having air inlet manifold in which a partial vacuum is produced as fuel and air are fed to said engine and said engine runs under its own power, said braking system including a vacuum tank, a first air duct connecting said inlet manifold to said tank to produce a partial vacuum in said tank, a check valve in said first duct to allow air flow in said first duct only towards said inlet manifold, fuel control means normally positioned to allow fuel to be fed to said engine in accordance with its requirements, a vacuum powered operator for said fuel control means adapted when energized to operate said fuel control means to a position of fuel shut to said motor, a second air duct connecting said vacuum powered operator to said tank and a vacuum limit control interposed in said second conduit between said tank and said operator, said limit control comprising valve means responsive to the degree of vacuum in said second air duct between said tank and said limit control alternately and overlapping to connect said operator through said second conduit to said tank and the atmosphere.

7. In an exhaust braking system for a vehicle powered by an internal combustion engine and in which the wheel brakes of the vehicle require the power of a partial vacuum for their operation, the required vacuum power being potentially provided by the engine when operating as an engine and stored in a storage tank on the vehicle, vacuum powered means for stopping the fuel flow to the engine when the air pressure in the tank is below a pre-set value and starting the fuel flow to the engine when the air pressure in the tank is above a pre-set value, said vacuum powered means including means for controlling the fuel flow to the engine, a vacuum powered operator for said controlling means, an air conduit connecting said operator with said tank and an air valve inserted in said air conduit, said air valve including spring means biasing said valve towards its closed position and means responsive to the reduction of pressure in said line at said air valve to overcome said biasing means and open said valve.

References Cited in the file of this patent

UNITED STATES PATENTS

| 1,247,930 | Campbell | Nov. 27, 1917 |
| 1,483,657 | Glidden | Feb. 12, 1924 |
| 1,483,658 | Glidden | Feb. 12, 1924 |
| 1,767,665 | Geiger | June 24, 1930 |
| 1,940,712 | Ertz | Dec. 26, 1933 |
| 2,227,107 | Rivers | Dec. 31, 1940 |
| 2,744,510 | Tyler et al. | May 8, 1956 |

FOREIGN PATENTS

| 431,293 | Great Britain | July 4, 1935 |